United States Patent
Six et al.

(10) Patent No.: US 8,904,043 B2
(45) Date of Patent: Dec. 2, 2014

(54) NETWORK DEVICE

(75) Inventors: Erwin Alfons Constant Six, Kalken (BE); Danny De Vleeschauwer, Evergem (BE)

(73) Assignee: Alcatel Lucent, Boulogne-Billancourt (FR)

( * ) Notice: Subject to any disclaimer, the term of this patent is extended or adjusted under 35 U.S.C. 154(b) by 2395 days.

(21) Appl. No.: 11/524,299

(22) Filed: Sep. 21, 2006

(65) Prior Publication Data

US 2007/0079003 A1     Apr. 5, 2007

(30) Foreign Application Priority Data

Sep. 22, 2005  (EP) .................................. 05291969

(51) Int. Cl.
| | |
|---|---|
| *G06F 15/16* | (2006.01) |
| *H04L 29/06* | (2006.01) |
| *H04L 12/801* | (2013.01) |
| *H04L 12/893* | (2013.01) |
| *H04L 1/16* | (2006.01) |

(52) U.S. Cl.
CPC ............... *H04L 47/10* (2013.01); *H04L 69/161* (2013.01); *H04L 69/16* (2013.01); *H04L 69/163* (2013.01); *H04L 47/40* (2013.01); *H04L 1/1607* (2013.01)
USPC ........................................................ 709/246

(58) Field of Classification Search
USPC ................................................ 709/246, 217
See application file for complete search history.

(56) References Cited

U.S. PATENT DOCUMENTS

| | | | |
|---|---|---|---|
| 5,519,699 A | 5/1996 | Ohsawa | |
| 6,282,172 B1* | 8/2001 | Robles et al. | 370/230 |
| 6,628,617 B1* | 9/2003 | Karol et al. | 370/237 |
| 6,975,647 B2* | 12/2005 | Neale et al. | 370/466 |
| 7,295,512 B2* | 11/2007 | Takatani et al. | 370/229 |
| 7,698,453 B2* | 4/2010 | Samuels et al. | 709/234 |
| 2001/0015956 A1 | 8/2001 | Ono | |
| 2001/0048683 A1 | 12/2001 | Allan et al. | |
| 2003/0035420 A1 | 2/2003 | Niu | |
| 2004/0006643 A1 | 1/2004 | Dolson et al. | |
| 2004/0120255 A1 | 6/2004 | Gross et al. | |

FOREIGN PATENT DOCUMENTS

GB      2 370 200 A      6/2002

OTHER PUBLICATIONS

"Transmission Control Protocol Darpa Internet Program Protocol Specification," Sep. 1981.*

* cited by examiner

*Primary Examiner* — Andrew Georgandellis
(74) *Attorney, Agent, or Firm* — Harness, Dickey & Pierce

(57) ABSTRACT

Network devices (30) receiving first packets from first devices (10) and in response transmitting second packets to second devices (20), and receiving third packets from the second devices (20) and in response transmitting fourth packets to the first devices (10), get manipulation means (40) for manipulating information at layers higher than internet protocol layers of headers of packets for improving transport efficiencies between the first and second devices (10,20). The higher layer may comprise a transport control protocol layer-4 to allow the network devices (30) to take over acknowledging functions of the second devices (20) and to take over re-transmission functions of the first devices (10) and to support the second devices (20) through offering additional buffer space and to support the first devices (10) through offering extended/advanced stream management.

11 Claims, 2 Drawing Sheets

NETWORK DEVICE

Figure 1:
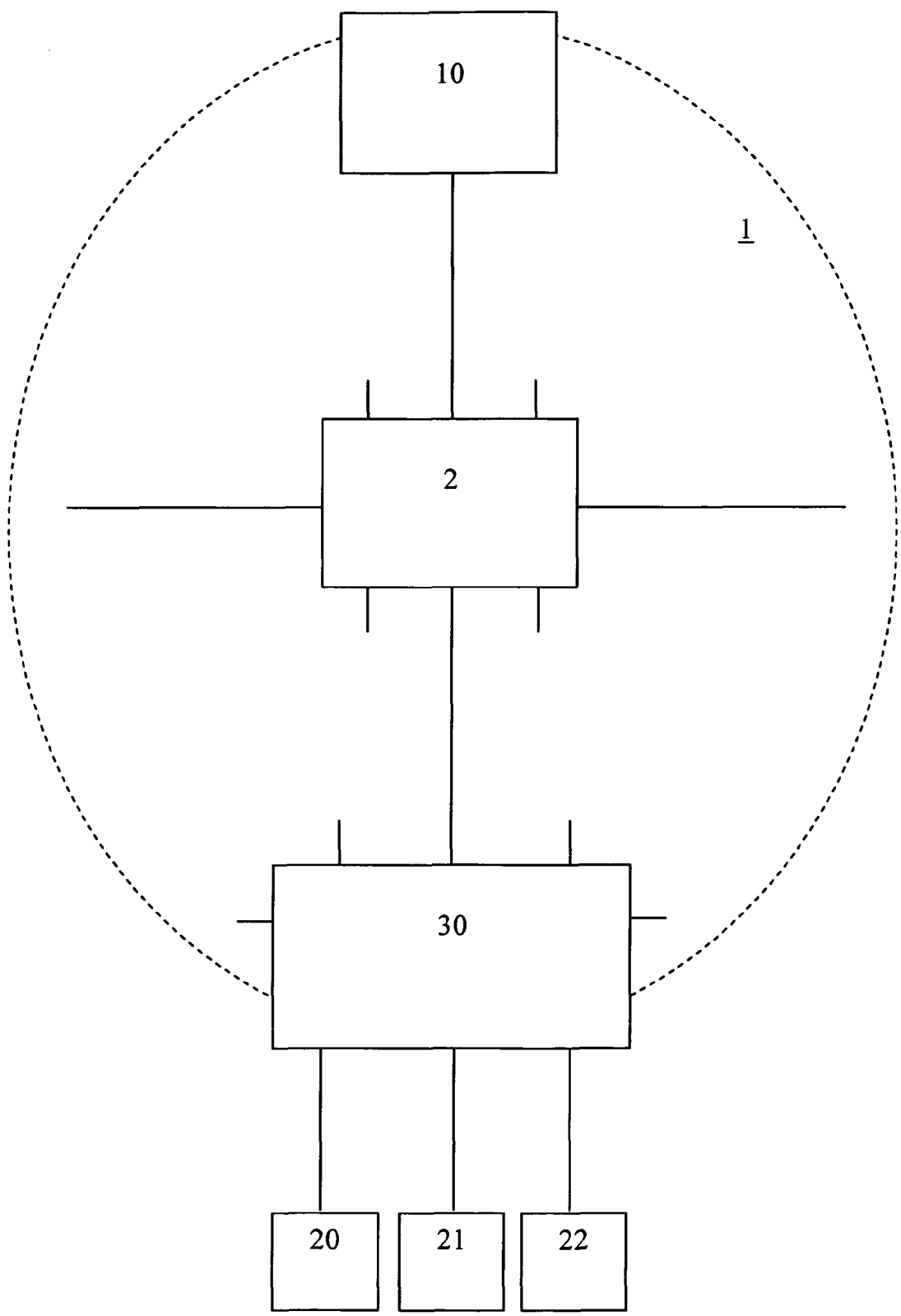

The invention relates to a network device for
receiving a first packet comprising first data and a first header from a first device, which first header comprises first information at a layer higher than an internet protocol layer,
in response to a reception of the first packet, transmitting a second packet comprising second data and a second header to a second device, which second header comprises second information at the layer higher than the internet protocol layer, the second data being equal to the first data,
receiving a third packet comprising third data and a third header from the second device, which third header comprises third information at the layer higher than the internet protocol layer, and
in response to a reception of the third packet, transmitting a fourth packet comprising fourth data and a fourth header to the first device, which fourth header comprises fourth information at the layer higher than the internet protocol layer, the fourth data being equal to the third data.

Examples of such a network device are access devices such as access nodes, access multiplexers, aggregation nodes, aggregation multiplexers and edge routers. The first device for example comprises a server device and the second device for example comprises a client device.

A prior art network device is of common general knowledge and is for example disclosed in US 2001/0048683. US 2001/0048683 discloses an access network comprising an access module (a network device) for a provision of content while supporting transparent quality of service capability and bandwidth frugality. The first device or server device is for example controlled by a service provider and the second device or client device is for example operated by a user.

With increasing bandwidth availability, a quality and/or speed as experienced by the user are more and more limited by protocols that operate at a layer higher than an internet protocol layer. The quality and/or the speed as experienced by the user might therefore be improved by developing new protocols at the layer higher than the internet protocol layer. A transition from old higher layer protocols to new higher layer protocols is however not to be preferred in view of the popularity of the existing higher layer protocols.

The known network device forms a part of the known network and does not interfere at a level of the higher layer protocols. This known network is disadvantageous, inter alia, owing to the fact that the quality and/or the speed as experienced by the user are susceptible of improvement for existing higher layer protocols.

It is an object of the invention, inter alia, to provide a network device as defined in the preamble that improves the quality and/or the speed as experienced by the user for existing higher layer protocols.

The network device according to the invention is characterized in that the network device comprises manipulation means for manipulating the information of at least one header of at least one packet for improving a transport efficiency between the first and second devices.

By introducing the manipulation means for manipulating information at a layer higher than an internet protocol layer of at least one header of at least one packet, the network device according to the invention can interfere at a level of the higher layer protocols. From a point of view of the first device, the network device according to the invention can for example take over one or more functions of the second device and/or can for example support the second device, and from a point of view of the second device, the network device according to the invention can for example take over one or more functions of the first device and/or can for example support the first device. This improves a transport efficiency between the first and second devices.

The network device according to the invention is further advantageous, inter alia, in that the existing higher layer protocols do not need to be changed and do not need to be replaced and in that the first and second devices do not need to be changed.

It should be noted that, per second, thousands or more first and third packets may be received by the network device and thousands or more second and fourth packets may be transmitted by the network device. Further, each packet may comprise further information in its header, which further information may be at any layer below, equal to and/or above the internet protocol layer. The data may be audio, video and other data.

An embodiment of the network device according to the invention is characterized in that the internet protocol layer comprises an internet protocol layer-3 and in that the layer higher than the internet protocol layer comprises a transport control protocol layer-4, the transport efficiency between the first and second devices being a transport efficiency from the first device to the second device.

The transport control protocol layer-4 is an existing and widely used protocol that, at least at the moment and for the next years, should not be changed and should not be replaced. Especially a transport efficiency from the first device to the second device is important when improving the quality and/or the speed as experienced by the user.

An embodiment of the network device according to the invention is characterized in that the first information comprises a sequence parameter and in that the manipulation means comprise detection means for detecting the sequence parameter and in that the manipulation means comprise insertion means for inserting an acknowledgement parameter in the fourth information before this acknowledgement parameter in the third information has been received, which acknowledgement parameter is related to the sequence parameter.

In this case, the network device takes over an acknowledging function of the second device, and pretends towards the first device that the second device has received the second packet before the second device has informed the network device of a good reception. Usually, after the second device has received the second packet with the second information comprising the sequence parameter, the second device inserts an acknowledgement parameter, that is related to the sequence parameter, into the third information of the third packet, as an acknowledgement. This relationship between the acknowledgement parameter and the sequence parameter can be any arbitrary relationship, the acknowledgement parameter may for example be equal to a sum of this sequence parameter and an amount of payload bytes received correctly, without excluding other relationships. According to the invention, before the network device has received this third packet with the information comprising the acknowledgement parameter, the network device inserts the acknowledgement parameter into an other and earlier third packet to confirm the good reception to the first device. As a result, a round trip delay is reduced, which improves the quality and/or the speed as experienced by the user, for example in case of congestion control mechanisms and/or flow control mechanisms being bottlenecks. The sequence parameter for example corresponds with a sequence number and the acknowledgement parameter for example corresponds with an acknowledgement number.

An embodiment of the network device according to the invention is characterized in that the manipulation means comprise deletion means for deleting the acknowledgement parameter from the third information.

The network device deletes the acknowledgement parameter in the third information to prevent that the first device is informed twice of a good reception. Such deletion means for example comprise overruling means for overruling the acknowledgement parameter.

An embodiment of the network device according to the invention is characterized in that the second information comprises a sequence parameter and in that the manipulation means comprise storage means for storing the second packet and in that the manipulation means comprise detection means for detecting an acknowledgement parameter in the third information and in that the manipulation means comprise transmission means for in dependence of a detection of the acknowledgement parameter transmitting the stored second packet to the second device.

In this case, the network device takes over a re-transmission friction of the first device, and pretends towards the second device that the first device has re-transmitted the second packet. A detection of an acknowledgement parameter in the third information, which detection for example comprises a multiple detection of an acknowledgement parameter that acknowledges a previous second packet with previous second information comprising a previous sequence parameter and that does not acknowledge the second packet with the second information comprising the sequence parameter, indicates that the second device has not received the second packet. As a result, a round trip delay is reduced, which improves the quality and/or the speed as experienced by the user. The sequence parameter for example corresponds with a sequence number and the acknowledgement parameter for example corresponds with an acknowledgement number.

An embodiment of the network device according to the invention is characterized in that the manipulation means comprise deletion means for deleting an old size parameter in the third information or the fourth information and in that the manipulation means comprise insertion means for inserting a new size parameter in the fourth information.

In this case, the network device adjusts a size parameter. This size parameter for example corresponds with an advertised window size and for example defines an available buffer space in the second device. This way, the first device and/or the second device can be supported by the network device, which improves the quality and/or the speed as experienced by the user. Such deletion means for example comprise overruling means for overruling the old size parameter.

An embodiment of the network device according to the invention is characterized in that the manipulation means comprise buffer means for buffering first packets and in that the new size parameter in the fourth information is larger that the old size parameter in the third information for simulating to the first device that the second device has a larger buffer capacity than actually present.

In this case, the second device is supported by the network device through offering the second device additional buffer space in the buffer means in the network device.

An embodiment of the network device according to the invention is characterized in that the new size parameter in the fourth information is smaller that the old size parameter in the third information for simulating to the first device that the second device has a smaller buffer capacity than actually present.

In this case, the first device is supported by the network device through offering the first device a possibility of reducing a first stream comprising the first packet and of increasing a second stream comprising a fifth packet towards the second device. In other words, this offers the first device to manage streams in a more extended and/or advanced way.

An embodiment of the network device according to the invention is characterized in that the internet protocol layer comprises an internet protocol layer-3 and in that the layer higher than the internet protocol layer comprises a user datagram protocol layer-4, the transport efficiency between the first and second devices being a transport efficiency from the first device to the second device.

The user datagram protocol layer-4 is an existing and widely used protocol that, at least at the moment and for the next years, should not be changed and should not be replaced. Especially a transport efficiency from the first device to the second device is important when improving the quality and/or the speed as experienced by the user. The user datagram protocol layer-4 may comprise an unreliable user datagram protocol and/or a reliable user datagram protocol (for example through a combination with a layer-5 protocol). This reliable user datagram protocol is relatively comparable with the transport control protocol, the unreliable user datagram protocol is relatively different from the transport control protocol.

It should be noted that it is important that the second data in the second packet is equal to the first data in the first packet and that the fourth data in the fourth packet is equal to the third data in the third packet, owing to the fact that complex devices exist that manipulate the data as well as the information at each level. Such complex devices cannot be used at the location of the network device for improving a transport efficiency between the first and second devices.

In addition, layer-3 address information in the first header will be equal to layer-3 address information in the second header, and layer-3 address information in the third header will be equal to layer-3 address information in the fourth header.

US 2001/0015956 discloses a packet size control technique that uses a window size. US 2003/0035420 discloses a transport control protocol aware local retransmissioner scheme for an unreliable transmission network. US 2004/0120255 discloses a determination of whether a data flow is restricted that uses a sequence number, an acknowledgement number and a window size. These prior art documents do not disclose the invention.

The invention also relates to manipulation means for use in a network device as defined above.

The invention also relates to a method comprising the steps of
receiving a first packet comprising first data and a first header from a first device, which first header comprises first information at a layer higher than an internet protocol layer,
in response to a reception of the first packet, transmitting a second packet comprising second data and a second header to a second device, which second header comprises second information at the layer higher than the internet protocol layer, the second data being equal to the first data, receiving a third packet comprising third data and a third header from the second device, which third header comprises third information at the layer higher than the internet protocol layer, and in response to a reception of the third packet, transmitting a fourth packet comprising fourth data and a fourth header to the first device, which fourth header comprises fourth information at the layer higher than the internet protocol layer, the fourth data being equal to the third data, which method according to the invention is characterized in that the method comprises the step of manipulating the information of at least one header of at least one packet for improving a transport efficiency between the first and second devices.

The invention also relates to a computer program product comprising the functions of receiving a first packet comprising first data and a first header from a first device, which first header comprises first information at a layer higher than an internet protocol layer, in response to a reception of the first packet, transmitting a second packet comprising second data and a second header to a second device, which second header comprises second information at the layer higher than the internet protocol layer, the second data being equal to the first data, receiving a third packet comprising third data and a third header from the second device, which third header comprises third information at the layer higher than the internet protocol layer, and in response to a reception of the third packet, transmitting a fourth packet comprising fourth data and a fourth header to the first device, which fourth header comprises fourth information at the layer higher than the internet protocol layer, the fourth data being equal to the third data, which computer program product according to the invention is characterized in that the computer program product comprises the function of manipulating the information of at least one header of at least one packet for improving a transport efficiency between the first and second devices.

The invention also relates to a medium comprising the computer program product as defined above.

Embodiments of the manipulation means according to the invention and of the method according to the invention and of the computer program product according to the invention and of the medium according to the invention correspond with the embodiments of the network device according to the invention. The manipulation means according to the invention can be produced and/or sold separately from the network device according to the invention.

The invention is based upon an insight, inter alia, that a network device such as an intermediate device located between a first device such as a source device and a second device such as a destination device should also be able to handle fourth layer and/or higher layer protocols. The invention is based upon a basic idea, inter alia, that between a first device such as a source device and a second device such as a destination device, it should also be possible to manipulate information at a fourth layer or a higher layer of a header of a packet.

The invention solves the problem, inter alia, to provide a network device as defined in the preamble that improves the quality and/or the speed as experienced by the user for existing higher layer protocols. The network device according to the invention is further advantageous, inter alia, in that the existing higher layer protocols do not need to be changed and do not need to be replaced and in that the first and second devices do not need to be changed.

These and other aspects of the invention will be apparent from and elucidated with reference to the embodiments(s) described hereinafter.

Figure 2:
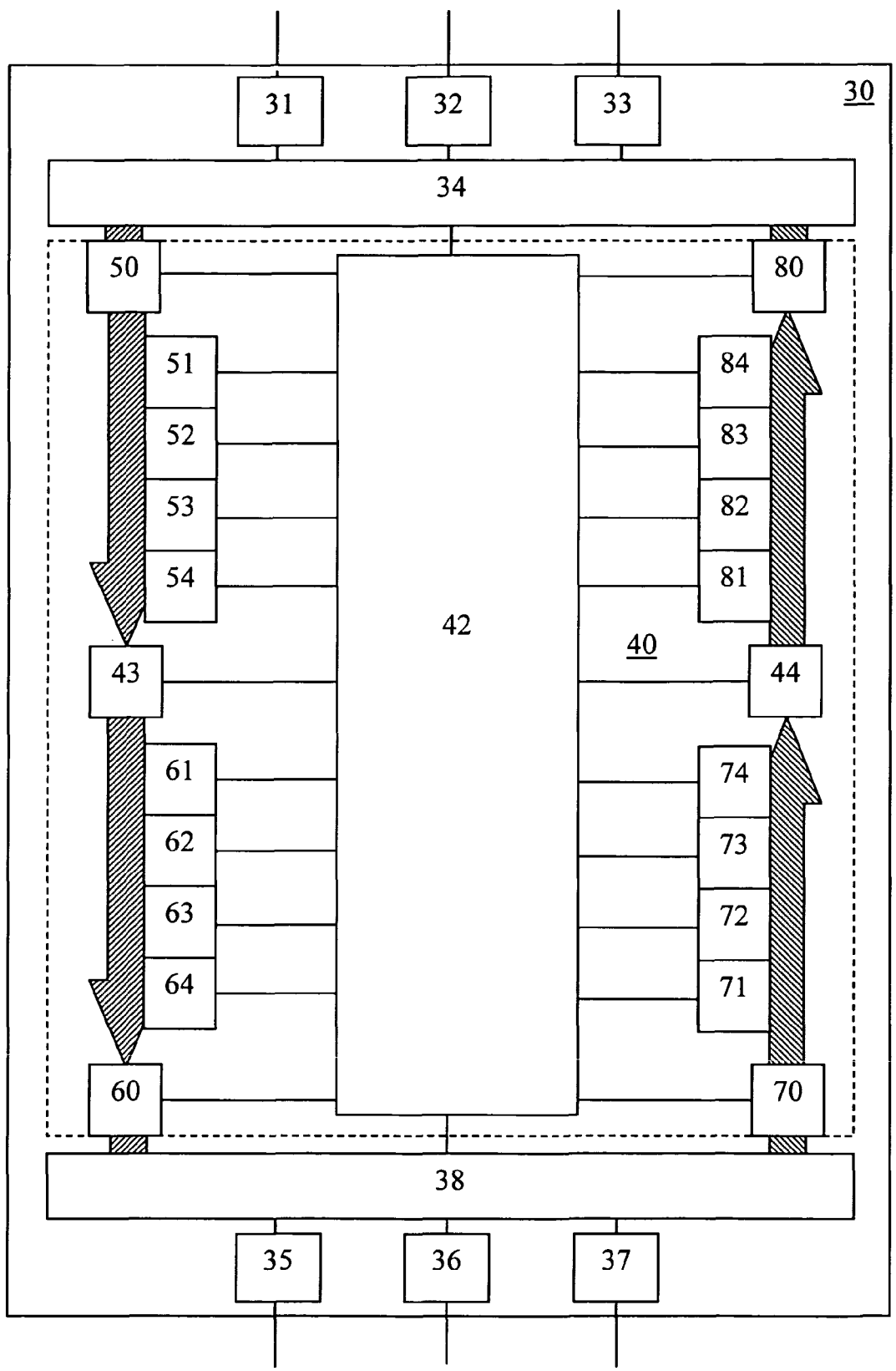

FIG. 1 shows diagrammatically a network device according to the invention coupled to a first device and to a second device, and FIG. 2 shows diagrammatically a network device according to the invention in greater detail.

The network device 30 according to the invention shown in FIG. 1 forms part of a network 1 that further comprises a switch 2 and a first device 10. The network device 30 is coupled to the first device 10 via the switch 2 and is further coupled to second devices 20-22. The first device 10 for example comprises a server device or a source device such as a server and the second device 20-22 for example comprises a client device or a destination device such as a modem or a pc. The network device 30 for example comprises an access device or an intermediate device such as an access node or an access multiplexer or an aggregation node or an aggregation multiplexer or an edge router.

The network device 1 according to the invention shown in FIG. 2 in greater detail comprises manipulation means 40 coupled to (connected to) an interface 34 and to an interface 38. The interface 34 is further coupled to (connected to) three network interfaces 31-33, with the interface 34 being further coupled to (connected to) the switch 2 shown in FIG. 1. The interface 38 is further coupled to (connected to) three subscriber interfaces 35-37, which are further coupled to (connected to) the second devices 20-22 shown in FIG. 1.

The manipulation means 40 comprise a processor 42. The processor 42 is coupled to (connected to) the interfaces 34 and 38 and to reception means 50 and 70 and to transmission means 60 and 80. A downstream bus guides first packets from the interface 34 via the reception means 50 to a downstream interface 43 also coupled to (connected to) the processor 42 and guides second packets from the downstream interface 43 via the transmission means 60 to the interface 38. An upstream bus guides third packets from the interface 38 via the reception means 70 to an upstream interface 44 also coupled to (connected to) the processor 42 and guides fourth packets from the upstream interface 44 via the transmission means 80 to the interface 34.

Between the reception means 50 and the downstream interface 43, the downstream bus is coupled to (connected to) detection means 51, deletion means 52, insertion means 53 and buffer means 54, which are all further coupled to (connected to) the processor 42. Between the downstream interface 43 and the transmission means 60, the downstream bus is coupled to (connected to) detection means 61, deletion means 62, insertion means 63 and storage means 64, which are all further coupled to (connected to) the processor 42. Between the reception means 70 and the upstream interface 44, the upstream bus is coupled to (connected to) detection means 71, deletion means 72, insertion means 73 and buffer means 74, which are all further coupled to (connected to) the processor 42. Between the upstream interface 44 and the transmission means 80, the upstream bus is coupled to (connected to) detection means 81, deletion means 82, insertion means 83 and storage means 84, which are all further coupled to (connected to) the processor 42.

In a prior art situation, the network device 30 does not interfere at a level of higher layer protocols, such as layer-4 protocols, layer-5 protocols and higher protocols. The reception means 50 receive, via the interface 34 and the network interface 32 and the switch 2, a first packet comprising first data and a first header from the first device 10, which first header comprises first information at a layer higher than an internet protocol layer-3. In response to a reception of the first packet, the transmission means 60 transmit, via the interface 38 and the subscriber interface 35, a second packet comprising second data and a second header to the second device 20, which second header comprises second information at the layer higher than the internet protocol layer-3, the second data being equal to the first data. In fact, in the prior art situation, the network device 30 may make amendments in the downstream headers at layer-1, layer-2 and/or layer-3, but from a layer-4 and higher the first and second downstream packets will be identical.

In this prior art situation, the reception means 70 receive, via the subscriber interface 35 and the interface 38, a third packet comprising third data and a third header from the second device 20, which third header comprises third information at the layer higher than the internet protocol layer-3. In response to a reception of the third packet, the transmission means 80 transmit, via the interface 34 and the network interface 32 and the switch 2, a fourth packet comprising fourth data and a fourth header to the first device 10, which fourth header comprises fourth information at the layer higher than the internet protocol layer-3, the fourth data being equal to the third data. In fact, in the prior art situation, the network device 30 may make amendments in the upstream headers at layer-1, layer-2 and/or layer-3, but from a layer-4 and higher the third and fourth upstream packets will be identical.

To improve the quality and/or the speed as experienced by a user at the second device 20 for existing higher layer protocols, the manipulation means 40 are arranged to manipulate the information of at least one header of at least one packet, which information is at a level higher than an internet protocol layer-3, as follows.

In a first situation, the internet protocol layer comprises an internet protocol layer-3 and the layer higher than the internet protocol layer comprises a transport control protocol layer-4, to improve a transport efficiency from the first device 10 to the second device 20 and/or to improve the quality and/or the speed as experienced by the user.

According to a first possibility, the first information comprises a sequence parameter as defined by the transport control protocol layer-4 and the detection means 51 are introduced to detect the sequence parameter and to inform the processor 42 and the insertion means 83 are introduced to receive an acknowledgement parameter from the processor 42 and to insert this acknowledgement parameter in the fourth information before this acknowledgement parameter in the third information has been received. This acknowledgement parameter is related to the sequence parameter. This way, the network device 30 takes over an acknowledging function of the second device 20, and pretends towards the first device 10 that the second device 20 has received the second packet before the second device 20 has informed the network device 30 of a good reception. Usually, after the second device 20 has received the second packet with the second information comprising the sequence parameter, the second device 20 inserts an acknowledgement parameter, that is related to the sequence parameter, into the third information of the third packet, as an acknowledgement. This relationship between the acknowledgement parameter and the sequence parameter can be any arbitrary relationship, the acknowledgement parameter may for example be equal to a sum of this sequence parameter and an amount of payload bytes received correctly, without excluding other relationships. According to the invention, before the network device 30 has received this third packet with the information comprising the acknowledgement parameter, the network device 30 inserts the acknowledgement parameter into an other and earlier third packet to confirm the good reception to the first device 10. As a result, a round trip delay is reduced, which improves the quality and/or the speed as experienced by the user. The sequence parameter for example corresponds with a sequence number and the acknowledgement parameter for example corresponds with an acknowledgement number.

In addition, the deletion means 72 are introduced to delete the acknowledgement parameter from the third information of the third packet originating from the second device 20, which acknowledgement parameter has been inserted into the third packet by the second device 20 to confirm a good reception of the second packet with the second information comprising the corresponding sequence parameter, to prevent that the first device 10 is informed twice of a good reception. Such deletion means 72 for example comprise overruling means for overruling the acknowledgement parameter.

According to a second possibility, the second information comprises a sequence parameter as defined by the transport control protocol layer-4 and the storage means 64 are introduced to store the second packet and the detection means 71 are introduced to detect an acknowledgement parameter in the third information and to inform the processor 42 and the transmission means 60 are arranged to, under control of the processor 42 and in dependence of a detection of the acknowledgement parameter, transmit the stored second packet to the second device 20. This way, the network device 30 takes over a re-transmission function of the first device 10, and pretends towards the second device 20 that the first device 10 has re-transmitted the second packet. A detection of an acknowledgement parameter in the third information, which detection for example comprises a multiple detection of an acknowledgement parameter that acknowledges a previous second packet with previous second information comprising a previous sequence parameter and that does not acknowledge the second packet with the second information comprising the sequence parameter, indicates that the second device 20 has not received the second packet. As a result, a round trip delay is reduced, which improves the quality and/or the speed as experienced by the user. The sequence parameter for example corresponds with a sequence number and the acknowledgement parameter for example corresponds with an acknowledgement number.

According to a third possibility, the deletion means 72 and/or 82 are introduced to delete an old size parameter in the third information or the fourth information and the insertion means 83 are introduced to insert a new size parameter in the fourth information. Such deletion means 72 and/or 82 for example comprise overruling means for overruling the old size parameter. These deletions may be performed in response to detections made by the detection means 71 and/or 81 that inform the processor 42. The insertion may be performed in response to a reception of the new size parameter from the processor 42. This way, the network device 30 adjusts a size parameter. This size parameter for example corresponds with an advertized window size and for example defines an available buffer space in the second device 20, to support the first device 10 and/or the second device 20, as described for A) and B).

According to A) the buffer means 54 are introduced to buffer first packets, whereby the new size parameter in the fourth information should be larger that the old size parameter in the third information, to simulate to the first device 10 that the second device 20 has a larger buffer capacity than actually present. This way, the second device 20 is supported by the network device 30 through offering the second device 20 additional buffer space in the buffer means 54 in the network device 30.

According to B) the new size parameter in the fourth information should be smaller that the old size parameter in the third information, to simulate to the first device 10 that the second device 20 has a smaller buffer capacity than actually present. This way, the first device 10 is supported by the network device 30 through offering the first device 10 a possibility of reducing a first stream comprising the first packet and of increasing a second stream comprising a fifth packet towards the second device 20.

In a second situation the internet protocol layer comprises an internet protocol layer-3 and the layer higher than the internet protocol layer comprises a user datagram protocol layer-4, to improve a transport efficiency from the first device 10 to the second device 20. This user datagram protocol layer-4 may comprise an unreliable user datagram protocol and/or a reliable user datagram protocol (for example through a combination with a layer-5 protocol).

Many alternatives are possible without departing from the scope of this invention. Especially in FIG. 2, blocks may be combined (such as an integration of 31 and 32 and 33 into 34 or vice versa, such as an integration of 35 and 36 and 37 into 38 or vice versa, such as an integration of 50 and 80 into 34 or vice versa, such as an integration of 60 and 70 into 38 or vice versa, such as an integration of 51-54 and 61-64 and 71-74 and 81-84 in 42 or vice versa, such as an integration of 31 and 32 and 33 into 34 or vice versa etc.), blocks may be divided into sub-blocks, and blocks may be left out (such as 43 and 44 in case the downstream bus and the upstream bus do not require such interfaces etc.). Further blocks not shown may be present and/or further functions not described may be present (such as decapsulators or decapsulating functions for decapsulating higher level headers before/in the reception means 50 and 70 and encapsulators or encapsulating functions for encapsulating higher level headers in/after the transmission means 60 and 80 etc.).

Reception means comprise for example at least one receiver, transmission means comprise for example at least one transmitter, detection means comprise for example at least one detector, deletion means comprise for example at least one replacer for replacing bits or bytes that are to be deleted by dummy bits or bytes, insertion means comprise for example at least one inserter, buffer means comprise for example at least one buffer, and storage means comprise for example at least one storage medium such as a memory.

Although the invention has been described for improving transport efficiencies from the first device 10 to the second device 20, the invention may alternatively be used vice versa. In other words, the first device 10 may alternatively be a client device or a destination device and the second device may alternatively be a server device or a source device.

In FIGS. 1 and 2, any block shown may comprise hardware and/or software. The computer program product according to the invention may be stored on a fixed medium for example forming part of the processor 42 or a removable medium not shown.

The expression "for" in for example "for receiving", "for transmitting" and "for manipulating" etc. does not exclude that other functions might be performed as well, simultaneously or not. The terms "a" and "an" do not exclude a possible presence of one or more pluralities. The steps/functions of "receiving", "transmitting" and "manipulating" etc. do not exclude further steps/functions, like for example, inter alia, the steps/functions described for the Figures etc.

The invention claimed is:

1. A network device comprising:
at least one first receiver for receiving a first packet including first data and a first header from a first device, the first header including first information at a layer higher than an internet protocol layer, the first information including a sequence parameter;
at least one first transmitter for transmitting a second packet in response to a reception of the first packet, the second packet including second data and a second header to a second device, which second header includes second information at the layer higher than the internet protocol layer, the second data being equal to the first data;
at least one second receiver for receiving a third packet including third data and a third header from the second device, the third header including third information at the layer higher than the internet protocol layer;
at least one second transmitter for transmitting a fourth packet in response to a reception of the third packet, the fourth packet including fourth data and a fourth header to the first device, which fourth header includes fourth information at the layer higher than the internet protocol layer, the fourth data being equal to the third data;
at least one detector for detecting the sequence parameter; and
at least one inserter for inserting an acknowledgement parameter in the fourth information of a fourth packet, said acknowledgement parameter being related to said sequence parameter and obtained from the third information of an earlier third packet; wherein
the at least one detector and the at least one inserter are for manipulating the information of at least one header of at least one packet for improving a transport efficiency between the first and second devices.

2. The network device as defined in claim 1, wherein,
the internet protocol layer includes an internet protocol layer-3,
the layer higher than the internet protocol layer includes a transport control protocol layer-4, and
the transport efficiency between the first and second devices is from the first device to the second device.

3. The network device as defined in claim 1, further comprising:
a replacer for deleting the acknowledgement parameter from the third information.

4. The network device as defined in claim 1, further comprising:
a storage medium for storing the second packet; and
a detector for detecting an acknowledgement parameter in the third information, wherein,
the second information includes a sequence parameter, and
the at least one of the first transmitter transmits the stored second packet to the second device based on a detection of the acknowledgement parameter.

5. The network device as defined in claim 1, further comprising:
at least one replacer for deleting an old size parameter in at least one of the third information and the fourth information, wherein
the at least one inserter for inserting a new size parameter in the fourth information.

6. The network device as defined in claim 5, characterized further comprising:
a buffer for buffering first packets, such that the new size parameter in the fourth information is larger than the old size parameter in the third information, simulating to the first device that the second device has a larger buffer capacity than actually present.

7. The network device as defined in claim 5, wherein, the new size parameter in the fourth information is smaller than the old size parameter in the third information, simulating to the first device that the second device has a smaller buffer capacity than actually present.

8. The network device as defined in claim 1, wherein, the internet protocol layer includes an internet protocol layer-3 and the layer higher than the internet protocol layer includes a user datagram protocol layer-4, the transport efficiency between the first and second devices being from the first device to the second device.

9. Method comprising:
receiving a first packet including first data and a first header from a first device, the first header including first information at a layer higher than an internet protocol layer, the first information including a sequence parameter;
transmitting a second packet in response to a reception of the first packet, the second packet including second data and a second header to a second device, the second header including a second information at the layer higher than the internet protocol layer, the second data being equal to the first data;
receiving a third packet including third data and a third header from the second device, which third header includes third information at the layer higher than the internet protocol layer; and
transmitting a fourth packet in response to a reception of the third packet, the fourth packet including fourth data and a fourth header to the first device, which fourth header includes fourth information at the layer higher than the internet protocol layer, the fourth data being equal to the third data;
detecting the sequence parameter; and
inserting an acknowledgement parameter in the fourth information of the fourth packet, said acknowledgement parameter being related to said sequence parameter and obtained from the third information of an earlier third packet; wherein
the detecting and inserting are for manipulating the information of at least one header of at least one packet for improving a transport efficiency between the first and second devices.

10. A non-transitory computer readable medium storing computer program instructions for performing a method of manipulating information, said computer program instructions defining the steps comprising:
receiving a first packet including first data and a first header from a first device, the first header including first information at a layer higher than an internet protocol layer, the first information including a sequence parameter;
transmitting a second packet in response to a reception of the first packet, the second packet including second data and a second header to a second device, the second header includes second information at the layer higher than the internet protocol layer, the second data being equal to the first data;
receiving a third packet including third data and a third header from the second device, the third header including third information at the layer higher than the internet protocol layer;
transmitting a fourth packet in response to a reception of the third packet, the fourth packet including fourth data and a fourth header to the first device, the fourth header including fourth information at the layer higher than the internet protocol layer, the fourth data being equal to the third data;
detecting the sequence parameter;
inserting an acknowledgement parameter in the fourth information of a fourth packet, said acknowledgement parameter being related to said sequence parameter and obtained from the third information of an earlier third packet; wherein
the detecting and inserting are for manipulating the information of at least one header of at least one packet for improving a transport efficiency between the first and second devices.

11. A non-transitory computer program product as defined in claim 10.

* * * * *